United States Patent [19]

Fish

[11] 4,187,058

[45] Feb. 5, 1980

[54] PORTABLE AIR COMPRESSOR

[75] Inventor: Darrell D. Fish, Timonium, Md.

[73] Assignee: Universal Security Instruments, Inc., Owings Mill, Md.

[21] Appl. No.: 917,936

[22] Filed: Jun. 22, 1978

[51] Int. Cl.² ............................................. F04B 21/00
[52] U.S. Cl. ........................................ 417/234; 141/98
[58] Field of Search ....................... 417/234, 411, 231; 141/98

[56] References Cited

U.S. PATENT DOCUMENTS

| 1,647,818 | 11/1927 | Semak | 417/411 X |
| 2,465,554 | 3/1949 | Roy | 417/234 X |
| 2,950,859 | 8/1960 | Kirk | 417/234 X |

Primary Examiner—Richard E. Gluck
Attorney, Agent, or Firm—Rose & Edell

[57] ABSTRACT

A portable air compressor which operates from a cigarette lighter socket is housed in a generally triangular casing having a luminescent triangular hazard warning on at least one surface. The casing includes a lower compartment in which the compressor and motor are stored and an upper compartment in which the power cord and air hose are stored. The two compartments are separated by a horizontal wall having a plurality of slots defined therethrough to provide adequate ventilation between the compartments. Flip-up access panels in the sidewalls provide easy access to the top compartment for deployment of the air hose and power cord. Openings in the front and rear walls at the top and bottom of the housing assure ample ingress of air, both to supply the compressor and to establish a convective cooling flow through the compartments and the slotted wall.

5 Claims, 4 Drawing Figures

U.S. Patent  Feb. 5, 1980  4,187,058
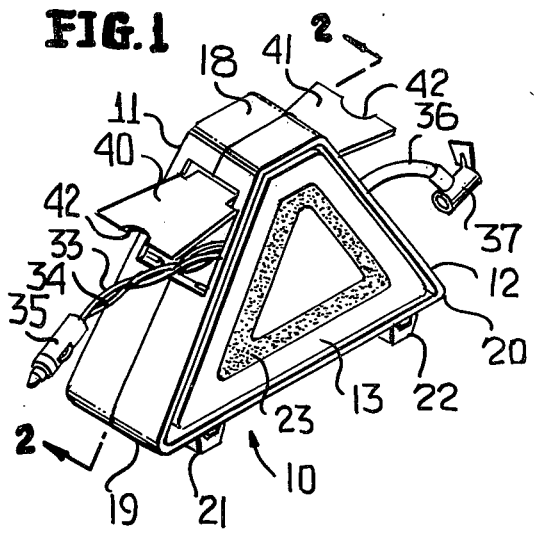
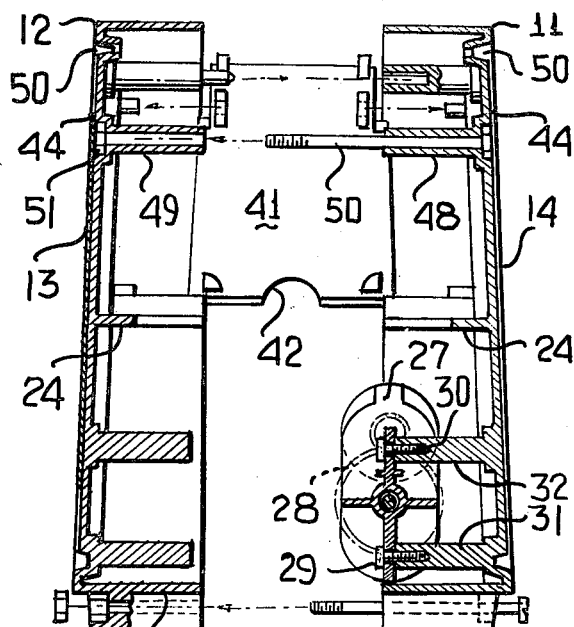
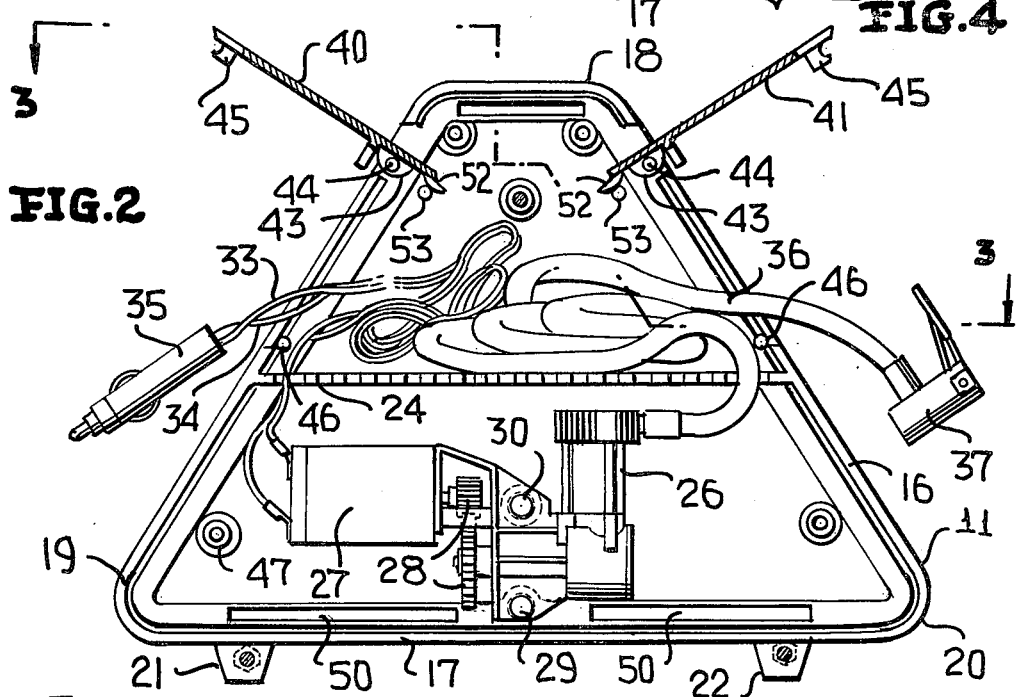
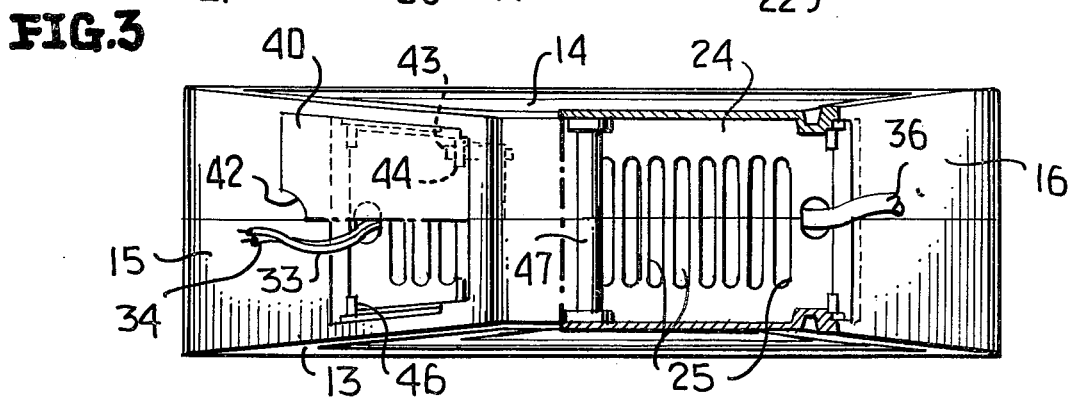

PORTABLE AIR COMPRESSOR

BACKGROUND OF THE INVENTION

The present invention relates to improvements in portable air compressors.

It is known in the prior art to provide portable air compressors which are adapted to plug into the cigarette lighter socket of an automobile or other vehicle. Such compressors are convenient for use as emergency tire inflators as well as for a variety of other purposes. Often, emergency tire inflation is required at night when visibility is limited and the stopped vehicle presents a hazard to oncoming traffic as well as to the operator of the stopped vehicle.

It is one object of the present invention to alleviate the aforementioned hazard involved in using portable air compressors for emergency tire inflation.

Another problem with prior art portable air compressors relates to their unwieldy condition for storage. Specifically, the air hose and electrical wiring are often loose and consequently become knotted or entangled in the vehicle trunk or other storage area. Attention to provide convenient housings for storage of the hose and wiring have resulted in assemblies which are inconvenient in actual use.

It is another object of the present invention to provide a housing for a portable air compressor which provides convenient storage for the compressor air base and electrical wiring and which is convenient to use.

Another disadvantage of prior art portable air compressors relates to lack of adequate ventilation. Ventilation is required both to assure an adequate air supply for the compressor and to prevent overheating of the compressor motor. In all prior art portable air compressors of which applicant is aware, insufficient ventilation is provided to assure reliable long-term operation.

It is therefore another object of the present invention to provide a portable air compressor housing which is adequately vented yet provides convenient storage for the air hose and wiring.

SUMMARY OF THE INVENTION

In accordance with the present invention, an air compressor and motor are disposed in a bottom compartment of a triangular-shaped housing. A multi-slotted horizontal wall separates the lower compartment from an upper compartment where the air hose and electrical power cord may be stored. The front and/or rear triangular surface is provided with a luminescent triangular strip which reflects light from oncoming vehicles to warn of the emergency condition. Openings through the housing walls into the upper and lower compartments, combined with the slotted wall between compartments, assure adequate air inflow for the compressor and air circulation for preventing overheating of the compressor and drive motor. Flip-up access panels in the housing sidewalls permit easy access to air hose and power cord. The triangular construction, combined with the low center of gravity afforded by the location of the compressor in the lower housing compartment, assure stable positioning of the housing for the dual purposes of tire inflation and hazard warning.

The above and still further objects, features and advantages of the present invention will become apparent upon consideration of the following detailed description of one specific embodiment thereof, especially when taken in conjunction with the accompanying drawings, wherein:

FIG. 1 is a view in perspective of a preferred embodiment of the present invention;

FIG. 2 is a view in section taken along lines 2—2 of FIG. 1;

FIG. 3 is a top view in partial section taken along lines 3—3 of FIG. 2; and

FIG. 4 is an exploded side view in section of the embodiment of the preferred embodiment of FIG. 1.

DESCRIPTION OF THE PREFERRED EMBODIMENT

Referring more specifically to the drawings, a housing 10 for an air compressor includes two separately molded plastic halves 11 and 12. The housing is of generally triangular configuration, having a triangular front wall 13, a triangular rear wall 14, joined by generally rectangular left, right and bottom walls 15, 16 and 17, respectively. The top 18 of the housing is flattened somewhat and the left and right apices 19 and 20, respectively, are rounded. Two base supports 21, 22 of generally inverted trapezoidal cross-section are formed integral with bottom wall 17 and extend transversely thereacross.

A luminescent decal in the shape of an outline of a triangle 23 is secured to the front surface of front wall 13. A similar decal (not shown) may be secured to the rear surface of real wall 14.

The interior of the housing 10 is subdivided into two compartments by a horizontally-extending wall 24. Multiple slots 25 are defined through wall 24 to provide free flow communication between the two compartments. The lower compartment houses an assembly comprising an air compressor 26, a drive motor 27 therefor, and a gearing arrangement 28 which couples the drive shaft of motor 27 to the driven shaft of air compressor 26. The air compressor-motor assembly is secured to the rear half 11 of the housing by means of screws 29, 30 which engage a pair of internally-threaded spacers 31, 32 which project inwardly from rear wall 14.

Energizing voltage for drive motor 27 is supplied via electrical leads 33, 34. Leads 33 and 34 terminate in a connector-adaptor 35 which is adapted to plug into a standard cigarette lighter socket commonly provided in automobiles and other vehicles. Pressurized air delivered from air compressor 26 is delivered through a hose 36 (of rubber, neoprene, etc.) which terminates in a standard nozzle connector 37 of the type commonly provided with bicycle pump hoses. Suitable holes 38, 39 are provided through opposite ends of horizontal wall 24 to permit leads 33, 34 and hose 36, respectively, to pass through; the holes are sufficiently small to preclude passage of electrical connector 35 and nozzle connector 37.

The upper compartment in housing 10 serves as a storage compartment for leads 33, 34 and electrical connector 35 and for hose 36 and its nozzle connector 37 when the unit is not in use. As best seen in FIG. 2, the leads and hose are readily curled or wound up and placed in the upper compartment.

A left access panel 40 provides access to the leads 33, 34 and connector 35 in the upper compartment through left sidewall 15. A right access panel 41 provides similar access to hose 36 and nozzle connector 37 through right sidewall 16. Each panel 40, 41 has a flat outer surface and a semi-circular cut-out portion 42 at its bottom edge. The top of the inside surface of each panel has a pair of aligned projections 43 which have aligned horizontally extending apertures adapted to rotatably engage aligned pins 44 extending from walls 13 and 14. The cooperation between apertured projections 43 and pins 44 permits panels 40, 41 to be pivoted up and outward, about pins 44, away from the respective housing walls 15, 16. For this purpose, one need only insert a finger through cut-out portion 42 to grab the panel and pull it outward. Sidewalls 15 and 16 of the housing are provided with suitable recessed shoulder regions to permit panels 40, 41 to fit flush with the outer surfaces of these walls and to serve as a stop whereby the panels are precluded from pivoting inwardly into the housing. In addition, each panel 40, 41 includes, near the bottom of its inner surface, a pair of latching projections 45 which include an overhanging lip adapted to provide a snap-engagement with further pins 46 projecting from the inner surfaces of walls 13 and 14. This snap-engagement holds the panel in place, preventing inadvertent opening, unless the panels are intentionally swung open by the user.

In fabrication of the unit, the two halves 11, 12 are individually molded from a suitable hard plastic material. The compressor and motor assembly is then mounted on the inner surface of wall 14 in housing half 11, below wall 25 as described, with hose 36 and leads 33, 34 being extended through the appropriately provided holes in wall 25 into the upper compartment. The two halves 11, 12 are then placed together, there being a plurality of suitably provided mating spacer elements 47 extending inwardly from both halves to simplify proper alignment. Also projecting inwardly from half 11 is a hollow tube 48 which aligns with a hollow tube 49 extending inwardly from half 12. A long screw 50 is extended through the aligned tubes 48, 49 and is engaged by a nut 51 to hold the two halves 11, 12 together. In addition, bores are provided through base supports 21, 22 to permit screws 52 to be extended therethrough and be engaged by nuts 53 to further secure the two halves of the housing together.

Decals 23 may be affixed after the halves 11, 12 are secured together.

Horizontally elongated slots 50 are defined through the top and bottom of front and rear walls 13 and 14 to provide ingress of air into the housing. In addition, the slots 25 in wall 24 provide a connective path to dissipate heat from the motor and compressor into the upper compartment where it can escape via slots 50 therein.

On either side of the top of the inside surface of each access panel 40, 41, there is provided latching projections 52. These projections are adapted pins 53 extending inwardly from walls 13, 14 when the panels are fully opened to hold the panels in the fully opened position. By this expedient the user need not continue to hold the panels open when removing the leads 33, 34 or hose 36.

The housing as described above is made of lightweight plastic material which is easily molded and fabricated. The electrical leads 33, 34 and hose 36 are readily stored inside the unit and are easily accessed when needed. The triangular configuration provides a stable structure which is not easily tipped or turned over. This stability is further aided by the low center of gravity afforded by the placing of the compressor and motor assembly in the lower compartment of the housing. The overall assembly is extremely compact and readily stored in a minimum of space. In addition, the reflective decal or tape 23 serves as an emergency warning device which can be used whether or not the compressor is in use.

The invention has primary utility as an emergency motor vehicle tire inflating device; however, it may be employed to inflate bicycle tires, basketballs, footballs, etc.

While I have described and illustrated one specific embodiment of my invention, it will be clear that variations of the details of construction which are specifically illustrated and described may be resorted to without departing from the true spirit and scope of the invention as defined in the appended claims.

I claim:

1. A portable device for inflating inflatables, comprising:
   a housing having front and rear walls of generally triangular configuration, and left, right and bottom walls extending between said front and rear walls;
   a dividing wall subdividing the interior of said housing into upper and lower compartments;
   an air compressor;
   a drive motor for said air compressor, said drive motor being operable when energized with twelve volts direct current;
   means mounting said air compressor and said drive motor in said lower compartment;
   a pair of electrical leads for supplying energizing voltage to said motor and extending from said motor through a suitable provided opening in said dividing wall into said upper compartment;
   adapter plug means connected to the ends of said electrical leads remote from said motor and adapted for insertion into a standard cigarette lighter socket of a vehicle;
   a hose for delivering pressurized air from said air compressor and extending therefrom through a suitably provided opening in said dividing wall into said upper compartment, said hose being terminated at a nozzle connector which is adapted to supply air to a standard automobile tire inflation stem;
   at least one selectively movable access panel provided in at least one of said left and right walls at said upper compartment to permit said electrical leads and said hose to be extended outside of said housing; and
   reflective means in the shape of the outline of a triangle secured to the outer surface of at least one of said front and rear walls;
   wherein said upper compartment is sufficiently large to contain said electrical leads, said adapter plug means, said hose and said nozzle connector when said device is not in use.

2. The device according to claim 1 wherein said dividing wall is provided with multiple slots for providing ventilation between said lower and upper compartments.

3. The device according to claims 1 or 2 further including a plurality of slots defined in said housing to permit entry of ambient air into said upper and lower compartments from outside said housing.

4. The device according to claims 1 or 2 further including a second access panel, said first access panel being provided in said left wall, said second access panel being defined in said right wall, each access panel being individually pivotable upwards and outward from said housing to provide access to said upper compartment.

5. The device according to claims 1 or 2 wherein said housing is fabricated from two generally triangular halves which are secured together along an imaginary plane which intersects said left, right and bottom walls.

* * * * *